(12) United States Patent
Arning et al.

(10) Patent No.: US 7,386,577 B2
(45) Date of Patent: Jun. 10, 2008

(54) DYNAMIC DETERMINATION OF TRANSACTION BOUNDARIES IN WORKFLOW SYSTEMS

(75) Inventors: Andreas Arning, Tuebingen (DE); Matthias Kloppmann, Sindelfingen (DE); Frank Leymann, Aidlingen (DE); Gerhard Pfau, Holzgerlingen (DE); Dieter Roller, Schoenaich (DE); Andreas Schmitz, Tuebingen (DE); Friedemann Schwenkreis, Leinfelden-Echterdingen (DE); Claudia Zentner, Stuttgart (DE)

(73) Assignee: International Business Machines Corporation, Armonk, NY (US)

(*) Notice: Subject to any disclaimer, the term of this patent is extended or adjusted under 35 U.S.C. 154(b) by 424 days.

(21) Appl. No.: 10/906,085

(22) Filed: Feb. 2, 2005

(65) Prior Publication Data

US 2005/0171930 A1 Aug. 4, 2005

(30) Foreign Application Priority Data

Feb. 4, 2004 (EP) .................................. 04100395

(51) Int. Cl.
*G06F 17/30* (2006.01)

(52) U.S. Cl. ..................................................... 707/201
(58) Field of Classification Search ............... 707/1–10, 707/100–104.1, 200–206
See application file for complete search history.

(56) References Cited

U.S. PATENT DOCUMENTS

| 7,103,597 | B2 * | 9/2006 | McGoveran | 707/8 |
| 2004/0068501 | A1 * | 4/2004 | McGoveran | 707/8 |
| 2005/0027712 | A1 * | 2/2005 | Gargi et al. | 707/100 |

* cited by examiner

*Primary Examiner*—Diane Mizrahi
(74) *Attorney, Agent, or Firm*—Duke W. Yee; A. Bruce Clay; Lisa L. B. Yociss

(57) ABSTRACT

Transactions within a process model are determined by grouping a set of individual process activities into a single transaction. This effectively reduces the processing overhead, and, therefore, improves the overall throughput and latency of the execution of the process model. The transaction is determined by performing an optimization procedure that takes into account the structure of the process model as well as various properties of the single process activities of the process model. Analysis of the properties of the process activities as well as application of the optimization procedure is performed dynamically during execution of the process model by a workflow engine.

17 Claims, 3 Drawing Sheets

DYNAMIC DETERMINATION OF TRANSACTION BOUNDARIES IN WORKFLOW SYSTEMS

FIELD OF THE INVENTION

The present invention relates to the field of workflow management systems (WFMS) and moreover to the dynamic determination of transactions in process models.

BACKGROUND AND PRIOR ART

Workflow management systems (WFMS) support the modeling and execution of business processes. Business processes specify which piece of work of a network of pieces is carried out in which sequence and which resources are exploited to carry out this work. Individual pieces of work might be distributed across a multitude of different computer systems connected by some type of network.

A powerful and sophisticated workflow management system, such as the product "IBM MQSeries Workflow" supports the modeling of business processes as a network of activities. This network of activities, the process model, is constructed using a directed, acyclic, weighted, colored graph as a meta model. The nodes of the graph represent the activities, which define the individual tasks that need to be carried out. It is worth noting that any other meta model, such as a hierarchical meta model, can be used for constructing process models without departing from the spirit of the patent application. In general, each of the activities is associated with a piece of code that implements the appropriate task. The edges of the graph, the control links, describe a potential sequence of execution of the activities. Control links are represented as arrows; the head of the arrow describes the direction in which the flow of control is moving through the process.

The activity where the control link starts is called the source activity and the activity where the control link ends is called the target activity. Obviously an activity can be a source and a target activity for different control links. Activities that have no incoming control link are called start activities, as they start the process. Activities which have no outgoing control link are called end activities, as after their completion the process has ended. Obviously an activity can be start as well as end activity.

The workflow management system's internal processing of an activity is carried out as an ACID transaction, regardless whether the invoked activity implementation participates in the transaction or not. The ACID paradigm defines the set of operations carried out within a transaction features have the properties of: atomicity, consistency, isolation, and durability. Atomicity specifies that either all operations of a transaction are applied to the system or none of them are. The consistency property specifies that all operations of a collection of operations lead to a new valid state of the system. The isolation property specifies that the operations of the collection do not affect operations outside the collection. The durability property finally specifies that the operations of the collection are not undone because of any later system failure.

Probably the most typical example of a transaction is the transfer of money from one bank account to another bank account. Here, the transaction consists of two operations; the withdrawal of money from one account and the deposit of money into the other account. In this case, both operations must succeed or none of them may succeed (atomicity). As the amount of money remains the same, the new state is a valid state of the system (consistency). The new state of the two accounts is not available to any other operation, until the transaction has completed (isolation). The changes that were due to the transaction must not be lost under any circumstances (durability).

The typical transaction that the workflow management system carries out when processing an activity consists of the following steps: starting of the transaction, reading from the process engine's persistent message queue, reading process state from a database, carrying out the appropriate logic, writing any process state changes to the database, putting a message into the persistent message queue, and finally committing the transaction. Storing the process state in a database and persistent message queues and carrying out the processing as a transaction provides for the desired recoverability of the business process in case an error occurs. Details about this processing can be found in Leymann/Roller: "Production Workflow: Concepts and Techniques", Prentice Hall PTR, 2000.

Processing pieces of code including access to data bases and message queues as a transaction is significantly more expensive than carrying out the same code non-transactional. The overhead for processing of a transaction consumes appreciable IT costs, such as CPU cycles, database access, and network and storage capacity.

The total processing overhead caused by transactional processing of the individual activities can be reduced by running a set of activities in a single transaction. The processing overhead of starting the transaction, reading the message from the persistent message queue, reading the process state from the database, writing process state changes to the database, putting a message into the persistent message queue, and committing the transaction is only performed once during the execution of the transaction that encompasses several activities. It is obvious, that by running a set of activities in a transaction the processing overhead is reduced by a factor. As a result both throughput and latency of the entire workflow management system are improved.

It should be noted that the transaction processing overhead is incurred regardless whether the invoked implementation is participating in the transaction or not.

The boundary of a transaction, the transaction boundary, is typically represented as a closed line surrounding the set of activities that are part of the transaction. The transaction is started when the first control link penetrates the transaction boundary from the outside; that means a control link whose source activity is not part of the transaction and whose target activity is part of the transaction is being followed. The transaction is committed, when the last control link penetrates the transaction boundary from within the transaction, that means a control link whose source activity is part of the transaction and whose target activity is not part of the transaction is being followed. It should be noted that outgoing control links that are transitively associated with subsequent incoming links are not taken into consideration for completing the transaction. Furthermore, the end of a transaction typically starts a new transaction with the exception of end activities. The points where the control link leaves the transaction, i.e. penetrates the transaction boundary, are also called commit points.

Combining a set of activities into a single transaction also has an important drawback. In case an activity fails, the transaction is aborted and all work already done by activities that have already run, is undone and must be redone when the transaction is restarted. This drawback must be taken into consideration when encompassing a set of activities into a single transaction, i.e. processing a set of activities as a single transaction.

In the opposite case in which each individual activity is processed as a transaction, no extra work is encountered when the activity fails. However, processing each individual activity as a transaction produces an appreciable processing overhead which is disadvantageous regarding throughput and latency of the workflow.

As defined in the prior art, the set of activities that should be processed in a single transaction need to be performed manually by a user, system administrator or process designer, quite often causing the re-structuring or re-modeling of the entire process model. Manual re-structuring is not only time consuming with required user interaction, but also depends heavily on the knowledge of the modeler. Furthermore in the prior art re-modeling or re-structuring of a process model can only be performed in a static rather than in a dynamic way, i.e. changes in the process model cannot be carried out until the modeled process has been deployed into the runtime environment.

Therefore, the present invention aims to provide a method, a data processing system and a computer program product for dynamically determining the transactions in a process model; i.e. determining the boundaries of a set of transactions that are established when the process is being carried out.

SUMMARY OF THE INVENTION

The present invention provides a method of determining the optimal number of transactions, i.e. the transactions and their boundaries, within a process model based on a set of goals specified for the execution of a process model. The process model has a plurality of different process activities. The inventive method of determining the transactions performs the steps of: analyzing the properties of each of the plurality of process activities, performing an optimization procedure on the basis of the properties of each of the plurality of process activities and optimization goals, and determining the transactions on the basis of this optimization procedure.

In order to reduce the processing overhead and associated IT costs for carrying out each individual activity as a transaction, the method aims to group a set of activities to be processed within a single transaction.

The optimization procedure for determining the transaction boundaries is performed on the basis of the properties of each of the plurality of process activities. Once the optimization procedure has been performed, the transaction boundaries are determined. When a workflow engine navigates through the process model, i.e. the workflow engine subsequently processes the individual activities of the process model, transactions are only committed at the determined transaction boundaries within the process model of the workflow.

According to a further preferred embodiment of the invention, the initial set of transactions is defined via some mechanism that allows the optimization procedure to determine the initial transaction boundaries. These transaction boundaries constitute the constraints in which the optimization method is executing. In other words, the optimization method may add additional transactions (indicated by their boundaries) but may not remove any of the initial set of transaction boundaries.

A particularly interesting approach to determine the boundaries of the minimum set of transactions is the usage of a transaction attribute property associated with the process activities.

The transaction attributes specify whether an activity requires its own transaction, whether an activity may be joined together with other activities into a transaction, whether a commit point has to be inserted before execution of the activity (i.e., the activity is processed in a new transaction), or whether a commit point has to be inserted after execution of the activity (i.e., the activity is just within the transaction boundary).

Referring to these different scenarios, the transaction attribute features one of the following expressions: "requires own", "participate", "commit before", "commit after". It should be noted that the shown values for transaction attributes are for illustration only, any other set of transaction attributes that help specify the transaction boundaries can be used without departing from the spirit of the method of defining transaction boundaries.

According to a further preferred embodiment of the invention, activities with implementations that are invoked asynchronously are generally made part of two transactions. Asynchronous invocation of an implementation is carried out in two distinct steps. In a first step, the implementation is invoked by a message which is processed by the invoked implementation. In a second step, the implementation invokes the workflow management system at a pre-defined entry point in order to return the result of the invoked implementation. This is in general also done by sending a message, preferably using persistent messages. When the request is to make the activity part of two transactions, the first step is made part of a first transaction, and the second part is made part of a second transaction.

According to a further preferred embodiment of the invention, the focus or goal of the optimization procedure can be directed to one or several of the following different aspects: cost minimization, compensation cost minimization, minimization of execution time, throughput maximization, or minimization of failure of execution. It should be noted that the values shown for the focus or goal of the optimization procedure are for illustration only; any other set of values specifying the goals of the optimization procedure can be used without departing from the spirit of the optimization procedure.

According to a further preferred embodiment of the invention, the properties of each process activity are further indicative of costs and/or failure probability and/or reason of failure and/or compensation costs associated with the execution of each process activity. Since the various activities of the process model produce different internal or external costs when executed, it is advantageous to provide this cost information to the optimization procedure. Here, internal costs refer to IT costs like CPU cycles, database space and database access or disc space, whereas external costs refer to business costs arising in the real world due to the execution of an activity.

The execution of a process activity may either fail or succeed. In case of failure, the process activity does not provide the required result but just generates appreciable costs. Depending on the reason or the type of failure, not only the failing activity has to be repeated, but the effects of all previously executed activities within the transaction have to be undone and then redone. Undoing the effects of the previously executed activities is typically carried out using compensation activities resulting in significant compensation costs. It should be noted that even if the effects of the previously executed activities are undone by another mechanism, significant costs occur and are subsumed under the notion of compensation costs.

Providing the properties of the process activities with cost and failure information allows performing the optimization procedure with respect to different aspects of the optimization goals, such as cost optimization, failure optimization or even timing optimization.

When, for example, a distinct activity is remarkably error-prone, it is advantageous to insert a commit point in the process model prior to execution of this distinct error-prone activity. Then, in case of failure, only this single activity has to be re-executed. In this case, the failure of this activity does not require repeated execution of preceding activities within the process model. Furthermore, the properties of an activity may provide a time interval within which the activity is typically executed. Exceeding this typical time interval during execution of the activity is in most cases an indication of a failure of the respective activity. In this case the process- or workflow engine may abort execution of the activity before the activity terminates with an error. The time interval can also be exploited for the determination of transaction boundaries. It is reasonable to insert a commit point right after an activity requiring a relatively large execution time. In case of failure of a subsequently executed activity, the time intensive activity need not to be repeated.

According to a further preferred embodiment of the invention, the analysis of the properties of each of the plurality of process activities is permanently performed during navigation of the process model. Since the properties of the process activity also provide statistical information of the activity such as failure probability, reliable failure information is most effectively gathered when a process activity is repeatedly applied and repeatedly analyzed.

According to a further preferred embodiment of the invention, the optimization procedure is performed dynamically during navigation of the process model. In this way, the method of determining transactions accounts for modifications and changes of properties of process activities that occur during navigation of the process model. Hence, the optimization procedure dynamically accommodates modifications referring to single process activities as well as to transactions encompassing a set of individual activities of the process model. For example, when, during repeated navigation of a process model, a distinct activity tends to become more and more error-prone, it is reasonable to insert a commit point before this distinct activity in the process model when the error-proneness of this activity exceeds a pre-defined threshold. In another way, a commit point can also be removed from the process model when the subsequent process activity becomes less erroneous during repeated navigation of the process model.

According to a further preferred embodiment of the invention, the properties of the individual activities are analyzed using data mining techniques. Data mining techniques allow prediction of the probability of whether a subsequent activity is subject to failure. In this way a reliable failure probability of each process activity can be determined before navigation of the process model is performed. This is of extreme advantage when the process model and its activities are only subject to execution for a few times. In such a case activity properties such as failure probability would not be very reliable since they are determined on a statistical basis using the behavior of an activity for only a limited number of subsequent executions.

Data mining techniques in general generate previously unknown, comprehensible, and actionable information from any source, including transactions and database contents. In particular, data mining takes advantage of the infrastructure of stored data, e.g., labels and relationships, to extract additional useful information. For example, by data mining a customer database, one might discover everyone who buys product A also buys product B and C six months later. Here the technique of data mining can effectively be used to further analyze the single operations of each process activity in order to obtain reliable information about the error-proneness of an activity. When for example an activity performs a set of single operations, each of which have a known error-proneness, the error-proneness of the activity can be predicted before the activity is even executed for the first time. Applying data mining techniques for a process model, therefore, provides an effective cost saving in an optimization procedure for determining transactions of a process model.

According to a further preferred embodiment of the invention, the various optimization goals or a relative impact of different optimization goals on the optimization procedure are modifiable by a user, a system administrator or a process designer with a user interface. In this way the optimization procedure can effectively be modified with respect to arbitrary preferences. A user, system administrator or process designer can thus specify different aspects of the optimization procedure.

According to a further preferred embodiment of the invention, the properties of each process activity are monitored and stored by making use of an audit log. An execution history of each process activity is generated and for each execution a corresponding entry is made in the audit log. In this way, statistical information of a process activity, being collected during repeated execution of the process model, such as a failure probability, can be easily extracted from the audit log.

Furthermore, the transaction attributes can be specified as a result of the optimization procedure and/or by means of the data mining technique and/or by means of a user input via the user interface. When, for example, an activity is particularly error-prone, it is reasonable that the corresponding transaction attribute equals "commit before" thereby defining that a new transaction starts with the execution of the error-prone activity. In another case, when an activity is associated to appreciable high costs, the corresponding transaction attribute should be "commit after". In this case a failure occurring in one of the subsequent activities has no drawback on the this cost-intensive activity, because it does not need to be repeated upon a subsequent failure.

In another aspect, the invention provides a data processing system for determining an optimal number of transactions, i.e. the transactions and their boundaries, based on a set of goals specified for the execution of a process model. The process model has a plurality of process activities. The data processing system further comprises means for analyzing the properties of each of the plurality of process activities, means for performing an optimization procedure on the basis of the properties of each of the plurality of process activities and optimization goals, and means for determining the transactions on the basis of this optimization procedure. In order to reduce the processing overhead and associated IT costs for carrying out each individual activity as a transaction, the data processing system aims to group a set of activities to be processed within a single transaction.

In still another aspect, the invention provides a computer program product for determining an optimal number of transactions, i.e. the transactions and their boundaries, based on a set of goals specified for the execution of a process model. The process model has a plurality of process activities. The computer program product comprises program means for analyzing the properties of each of the plurality of process activities, program means for performing an optimization procedure on the basis of the properties of each of the plurality of process activities and optimization goals, and program means for determining the transactions on the basis of this optimization procedure. In order to reduce the processing overhead and associated IT costs for carrying out each individual activity as a transaction, the computer program product aims to group a set of activities to be processed within a single transaction.

BRIEF DESCRIPTION OF THE DRAWINGS

In the following, preferred embodiments of the invention will be described in greater detail by making reference to the drawings, in which.

DETAILED DESCRIPTION

Figure 1:
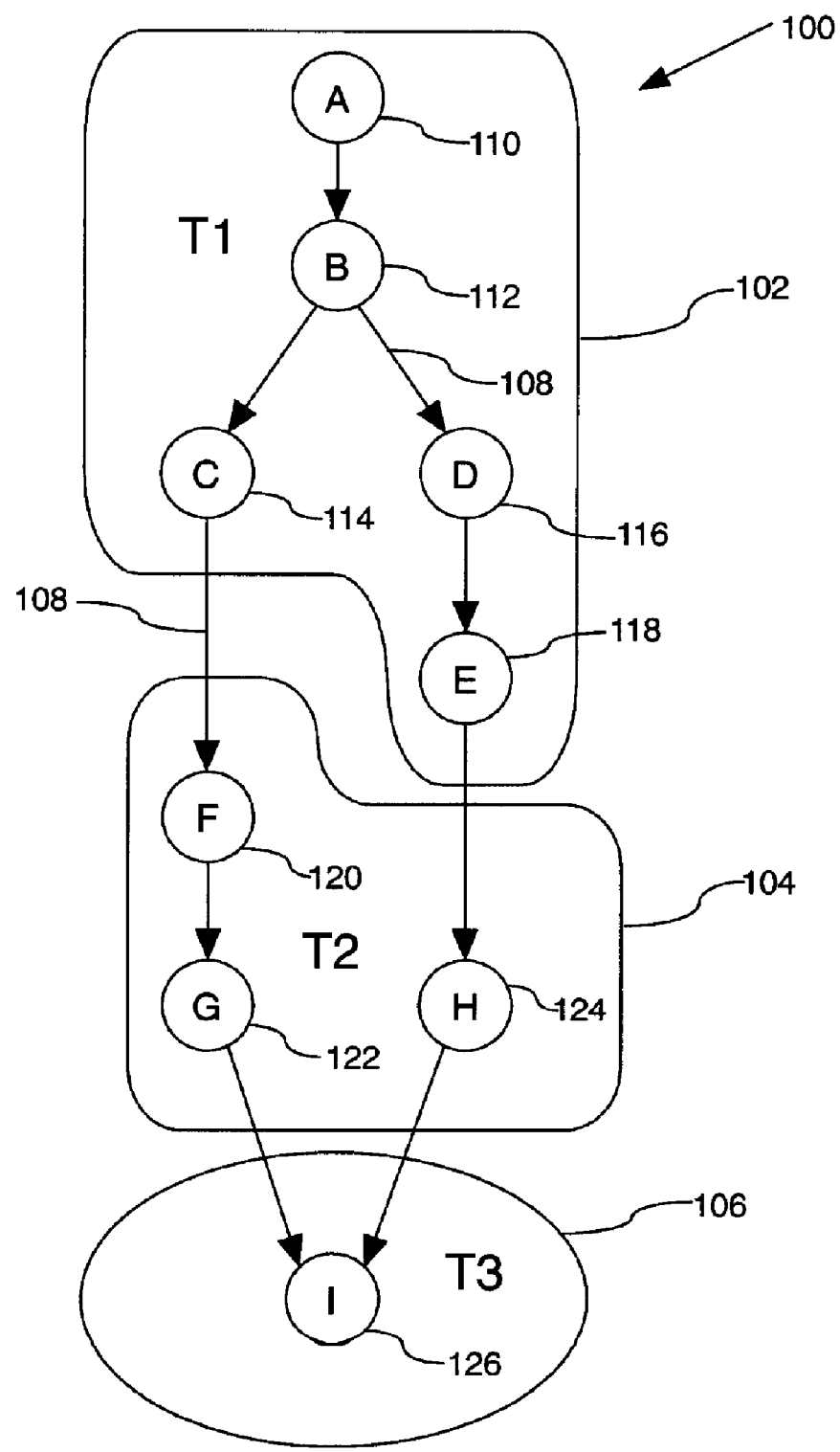
FIG. 1 shows a process model with a plurality of activities grouped in three different transactions.

FIG. 1 illustrates a process model 100 having nine process activities 110, 112, 114, 116, 118, 120, 122, 124 and 126. The single process activities are connected by control links 108 indicating the order of execution of the individual process activities 110-126. The order of execution does not specify the temporal execution order of the single activities. A control link merely specifies a constraint that a target activity cannot be executed prior to execution of a source activity. Therefore, execution of activity B 112 cannot be performed prior to execution of activity A 110. Since activity B 112 is a fork activity, the subsequent activities C 114 and D 116 represent different execution branches of the process model 100. The first execution branch is represented by the three process activities C 114, F 120 and G 122, whereas the second execution branch is represented by the three process activities D 116, E 118 and H 124. Both execution branches finally merge in the join activity I 126.

The entire process model 100 is divided into three different transactions T1 102, T2 104 and T3 106. Transaction T1 102 features five individual process activities 110, 112, 114, 116, and 118. Transaction T2 features three process activities 120, 122, and 124 and the transaction T3 has a single process activity 126.

The transactions 102, 104, 106 and their associated boundaries are specified on the basis of the properties of the individual process activities 110-126. Based on the properties of each individual process activity and on the set of goals of optimization, the optimization procedure determines transaction boundaries by defining transaction attributes for each individual process activity 110-126.

The process model basically constitutes three different types of components: activities, control links and transactions specified by transaction boundaries. Whereas the static structure of activities and control links is designed by a process modeler, the definition of transactions by specifying transaction boundaries can be determined by the invention. Modification of transaction boundaries leaves the structure of activities and control links unaltered but may have major impact for throughput and latency of the navigation of the entire process model. Therefore, the invention provides an effective approach to improve the performance of workflow execution by minimally modifying the corresponding process model.

In the example illustrated in FIG. 1, among all process activities 110-126, process activity F 120 feature a high error-proneness, process activity E 118 is associated with high costs and process activity I 126 is an asynchronous process activity requiring a transaction on its own. Due to its high error-proneness, the transaction attribute of process activity F 120 is set to "commit before" and due to its expenses, the transaction attribute of process activity E 118 is set to "commit after". Both transaction attributes "commit before" and "commit after" require a transaction boundary either before or after execution of the relevant activity. Since the process activity I 126 requires an own transaction, its associated transaction attribute is set to "requires own". Assuming that all other activities of the process model feature the transaction attribute "participate", the process model is divided into a set of transactions on the basis of transaction attributes of the process activities E 118, F 120 and I 126.

Combining the "commit before" attribute of process activity F 120, defining the start of a new transaction, with the "commit after" attribute of process activity E 118, defining the end of a transaction, clearly specifies the boundary of transaction T1 102. Therefore, transaction T1 features five individual process activities 110, 112, 114, 116 and 118. Transaction T3 106 is simply defined by the "requires own" attribute of process activity I 126, thereby also defining the transaction boundary of transaction T2 104. Transaction T2 is started due to the transaction attributes of the two process activities E 118 and F 120 requiring a start point and specifying an end point of the preceding transaction. Termination of transaction T2 is defined by the transaction attribute of process activity I 126, specifying a new transaction T3, inherently requiring termination of transaction T2 104.

During repeated navigation of the entire process model, the properties of individual process activities significantly change. The optimization procedure may determine other transaction attributes for some of the process activities either resulting in a modification of existing transactions or in a creation of additional transactions of the process model. When, for example, process activity H 124 is repeatedly subject to failure, it may be assigned a "commit after" attribute. In this case process activity H 124 may be encapsulated in an additional fourth transaction which helps to confine any drawback arising from a failure of activity H 124. In this case, the activities F 120 and G 122 are executed within one transaction and the process activity is executed within an additional transaction. In this way, the drawback arising from a failure of execution of activity H 124 has no impact on the execution of other activities of the process model.

In this way, the optimization procedure dynamically accommodates changes occurring during repeated execution of the process model. Consequently, the definition of transactions becomes dynamic rather than remaining static. Execution of process activities is logged by means of an audit log providing statistical information of the individual process activities, as e.g. failure occurrence. Furthermore, the properties of individual process activities can effectively be determined by making use of data mining techniques.

For purposes of illustration, FIG. 1 represents a simple process model, to which the inventive method of determining transaction boundaries is not limited. The inventive method herein is especially helpful for complicated process models having a huge set of execution branches with a number of fork- and join activities.

Figure 2:
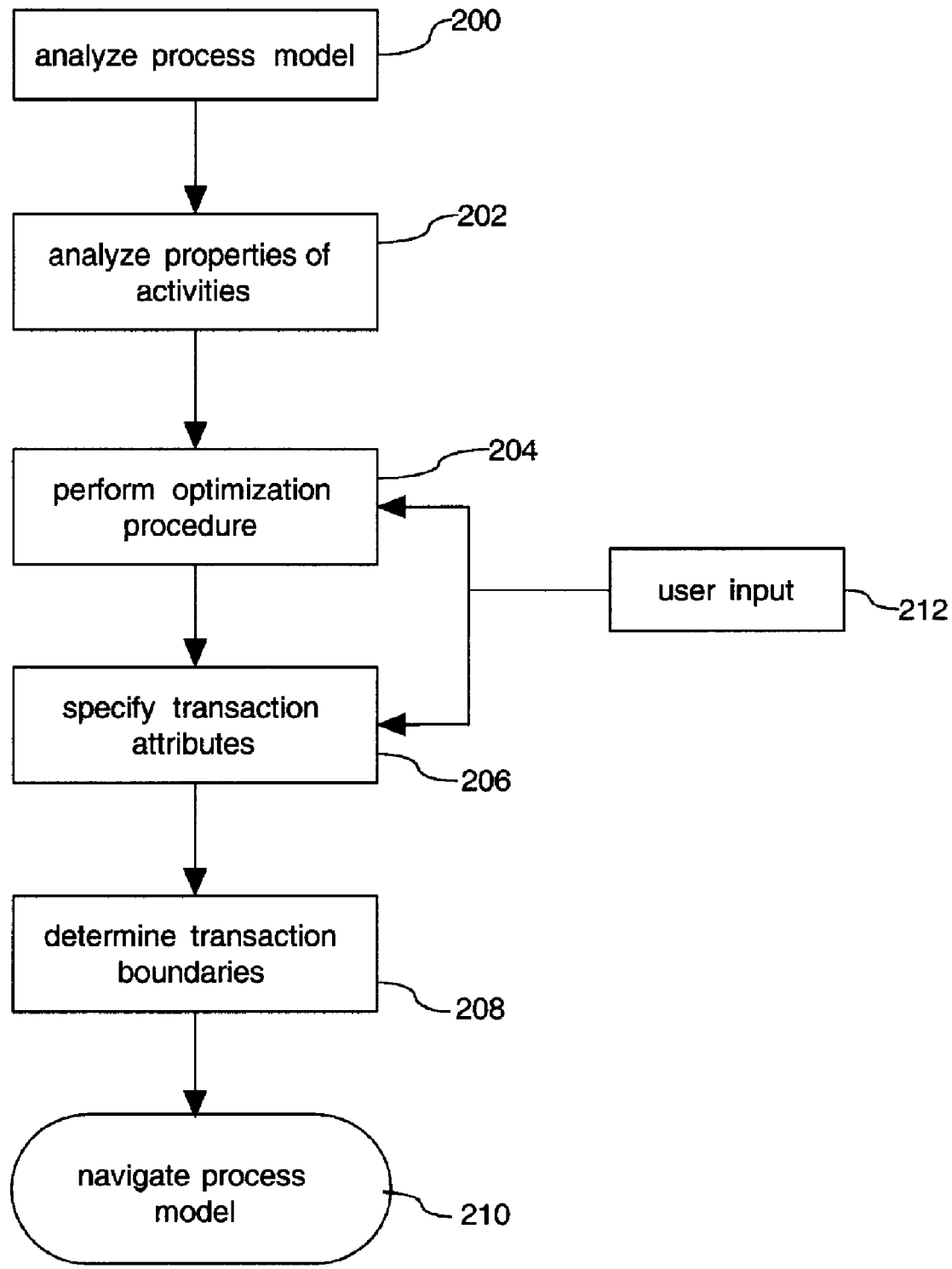
FIG. 2 is illustrative of a flowchart for determining transaction boundaries.

FIG. 2 illustrates a flowchart for performing the optimization procedure to dynamically determine transactions in a process model. In a first step 200 the process model is analyzed. Thereafter in the following step 202 the properties of the single activities of the process model are analyzed. In this way information about the structure of the process model as well as information about costs, failure probability, reason for failure and eventual compensation costs is extracted from the process model and its process activities. Based on this provided information, in the next step 204 the optimization procedure can be performed in order to reduce the processing overhead by grouping a set of individual activities into one transaction.

As a result of the optimization procedure 204, transaction attributes are specified for each activity of the process model in step 206. Furthermore, in step 212, user input is processed to modify the performing of the optimization procedure in step 204, as well as to manually manipulate the specification of transaction attributes in step 206. Based on the transaction attributes specified in step 206, corresponding transactions are determined in step 208. Once the transactions and their boundaries are determined in step 208, the workflow engine starts or continues with the navigation of the process model in step 210.

The optimization procedure and the determination of transaction boundaries with respect to the properties of the single process activities is preferably performed during navigation of the process model. Every time a process activity is executed, its behavior is monitored and stored by the audit log, therefore, representing an execution history of each process activity when the entire process model is repeatedly executed.

Figure 3:
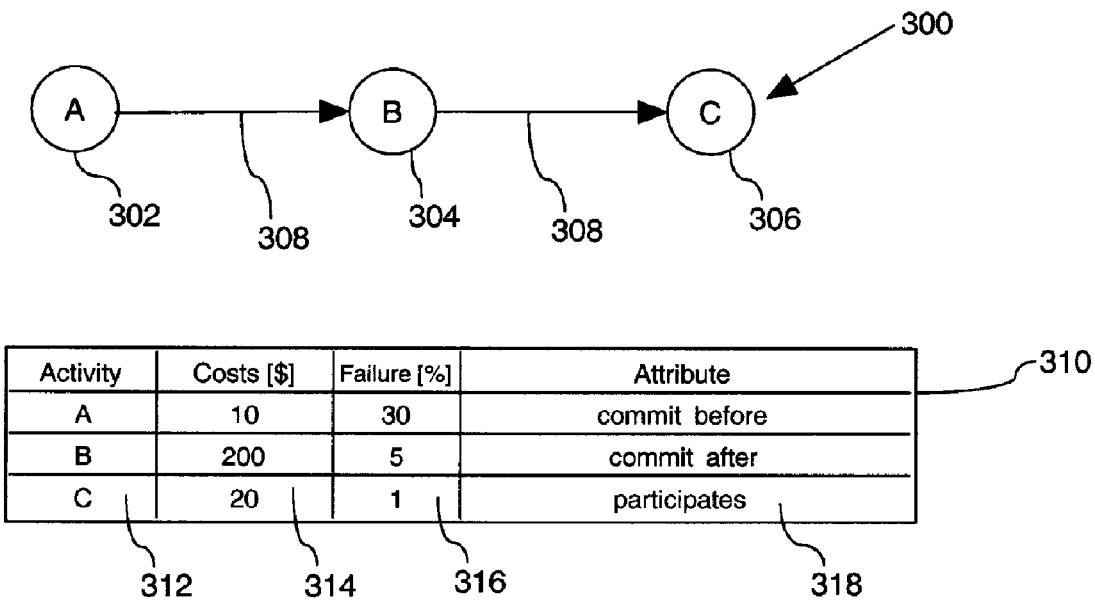
FIG. 3 shows the structure of a simple process model and a corresponding monitoring table.

FIG. 3 illustrates the structure of a very simple process model 300 having three process activities 302, 304 and 306 that are consecutively executed. Therefore the three process activities are connected by two control links 308. Furthermore, a monitoring table provides information about the individual activities. The monitoring table 300 has an activity list 312, a cost list 314, a failure list 316, and an attribute list 318. For each activity 302, 304 and 306 the monitoring table 310 provides corresponding execution costs as well as the failure probability. For example, the execution of the process activity A 302 costs $10 but fails in 30% of all invoked executions. Since this failure probability is relatively large it is reasonable that the corresponding transaction attributes is set to "commit before".

The subsequent process activity B 304 produces costs of $200 when executed but fails only in 5% of all invoked cases. Since this activity is rather expensive, the transaction attribute is set to "commit after". Regardless of whether a subsequent activity is subject to failure, activity B 304 is not repeated because activity B 304 is the last activity of the transaction. Activity C 306 produces costs of $20 when executed but almost never fails. In this case it is reasonable to set the transaction attribute to "participate" in order to enable an embedding of activity C 306 into a transaction. Depending on the properties of a subsequent activity, a transaction boundary will be set thereafter. When there is no transaction boundary directly following activity C 306, the transaction is kept open, and when a subsequeny failure of this open transaction, the process activity C 306 will eventually be repeated. This scenario is only associated to intermediate, hence costs are considered affordable and will seldom occur taking into account the statistical failure information.

Figure 4:
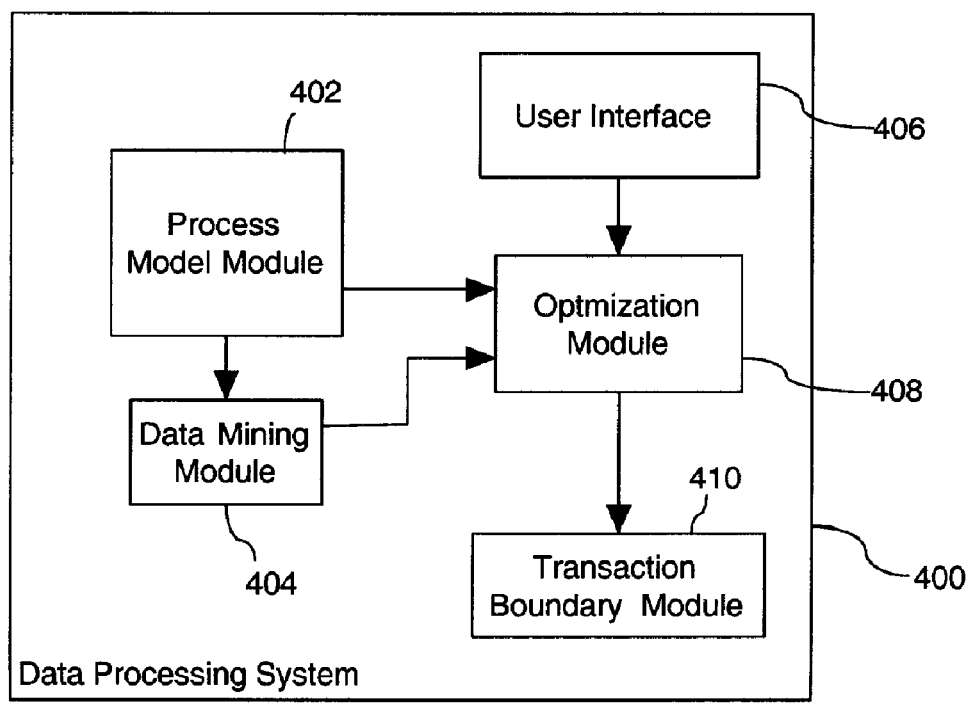
FIG. 4 shows a block diagram of a data processing system for determining the transaction boundaries of a workflow.

FIG. 4 shows a block diagram of a data processing system 400 for determining transaction boundaries within the process model. The data processing system 400 has a process model module 402, a data mining module 404, a user interface 406, an optimization module 408 and a transaction boundary module 410.

The process model module 402 provides the structure of the process model as well as the properties of the single activities of the process model. The data mining module 404 extracts further information about the single activities of the process model to predict failure probability of each process activity of the process model. The process model module 402 as well as the data mining module 404 are both connected to the optimization module 408. The optimization module 408 performs the optimization procedure on the basis of the properties of each process activity and the structure of the process model. With the user interface 406 connected to the optimization module 408, a user can introduce manual modifications and changes as well as determine a weighting and/or impact of different transaction policies on the optimization procedure.

Once the optimization procedure has been performed by the optimization module 408 the result is passed to the transaction boundary module 410. The result of the optimization procedure can be represented by the transaction attributes being associated to each process activity. The transaction boundary module 410, therefore, only needs to interpret the transaction attributes of each process activity in order to determine corresponding transactions and transaction boundaries.

Although the present invention has been described with respect to a specific preferred embodiment thereof, various changes and modifications may be suggested to one skilled in the art, and it is intended that the present invention encompass such changes and modifications as fall within the scope of the appended claims.

What is claimed is:

1. A method of dynamically determining transaction boundaries in workflow systems, comprising the steps of:

defining a process model that includes a plurality of process activities, the plurality of process activities connected together using control links that define the order of execution of the plurality of process activities, said process model being a static design wherein the plurality of process activities and order of execution do not charge during repeated executions of the process model;

assigning an attribute to each one of the plurality of process activities that is one of a "requires own", "participate", "commit before", and "commit after";

defining an initial set of transactions by dividing the plurality of process activities into said initial set of transactions using an initial set of transaction boundaries;

said attribute that is assigned to a first one of the plurality of process activities being "participate";

repeatedly executing said entire process model including repeatedly executing said plurality of process activities;

analyzing properties of each one of said plurality of process activities each time said process model is executed;

logging information in an audit log about said properties of each one of said plurality of process activities, said audit log representing an execution history of each one of said plurality of process activities;

after repeatedly executing said entire process model, determining that the first one of the plurality of process activities repeatedly fails;

after determining that the first one of the plurality of process activities repeated fails, transforming said attribute that is assigned to the first one of the plurality of process activities to "commit after";

in response to said attribute that is assigned to said first one of the plurality of process activities being transformed to "commit after", dynamically defining a second set of transactions by dividing the plurality of process activities into the second plurality of transactions using a second set of transaction boundaries;

said second plurality of transactions determined to be an optimal number of transactions;

the process model being unchanged after the plurality of process activities are divided into the second plurality of transactions;

new process activities are not added to said process model and none of said plurality of activities is deleted from said process model after the plurality of process activities are divided into the second plurality of transactions; and the order of execution being unchanged after the plurality of process activities are divided into the second plurality of transactions.

2. The method according to claim 1, wherein the properties of each process activity are indicative of costs and failure probability and reason of failure and compensation costs associated to each process activity.

3. The method according to claim 1, wherein the analysis of the properties of the process activities is performed dynamically during navigation of the process model.

4. The method according to claim 1, wherein the properties of the process activities are analyzed by making use of data mining techniques.

5. The method according to claim 1, wherein impact and a relative weighting of optimization goals are dynamically modified in response to a user input.

6. The method according to claim 1, further comprising the step of:

said second plurality of transactions determined to be an optimal number of transactions to accomplish one of cost minimization, compensation minimization, minimization of execution time, throughput maximization, and minimization of failure of execution.

7. A data processing system for dynamically determining transaction boundaries in workflow systems comprising:

a process model that includes a plurality of process activities, the plurality of process activities connected together using control links that define the order of execution of the plurality of process activities, said process model being a static design wherein the plurality of process activities and order of execution do not change during repeated executions of the process model;

means for assigning an attribute to each one of the plurality of process activities that is one of a "requires own", "participate", "commit before", and "commit after";

means for defining an initial set of transactions by dividing the plurality of process activities into said initial set of transactions using an initial set of transaction boundaries;

said attribute that is assigned to a first one of the plurality of process activities being "participate";

means for repeatedly executing said entire process model including repeatedly executing said plurality of process activities;

means for analyzing properties of each one of said plurality of process activities each time said process model is executed;

means for logging information in an audit log about said properties of each one of said plurality of process activities, said audit log representing an execution history of each one of said plurality of process activities;

after repeatedly executing said entire process model, means for determining that the first one of the plurality of process activities repeatedly fails;

after determining that the first one of the plurality of process activities repeated fails, means for transforming said attribute that is assigned to the first one of the plurality of process activities to "commit after";

in response to said attribute that is assigned to said first one of the plurality of process activities being transformed to "commit after", means for dynamically defining a second set of transactions by dividing the plurality of process activities into the second plurality of transactions using a second set of transaction boundaries;

said second plurality of transactions determined to be an optimal number of transactions;

the process model being unchanged after the plurality of process activities are divided into the second plurality of transactions new process activities are not added to said process model and none of said plurality of activities is deleted from said process model after the plurality of process activities are divided into the second plurality of transactions; and the order of execution being unchanged after the plurality of process activities are divided into the second plurality of transactions.

8. The data processing system according to claim 7, wherein the properties of each process activity are indicative of costs and failure probability and reason of failure and compensation costs associated to each process activity.

9. The data processing system according to claim 7, further comprising means for dynamically analyzing the properties of the process activities during navigation of the process model.

10. The data processing system according to claim 7, further comprising means for analyzing the properties of the process activities by making use of data mining techniques.

11. The data processing system according to claim 7, further comprising a user interface allowing processing of modifications of an impact and a relative weighting of optimization goals in response to a user input.

12. The system according to claim 7, further comprising:

said second plurality of transactions determined to be an optimal number of transactions to accomplish one of cost minimization, compensation minimization, minimization of execution time, throughput maximization, and minimization of failure of execution.

13. A computer program product that is stored in a computer readable medium for dynamically determining transaction boundaries in workflow systems, the computer program product comprising:

instructions for defining a process model that includes a plurality of process activities, the plurality of process activities connected together using control links that define the order of execution of the plurality of process activities, said process model being a static design wherein the plurality of process activities and order of execution do not change during repeated executions of the process model;

instructions for assigning an attribute to each one of the plurality of process activities that is one of a "requires own", "participate", "commit before", and "commit after";

instructions for defining an initial set of transactions by dividing the plurality of process activities into said initial set of transactions using an initial set of transaction boundaries;

said attribute that is assigned to a first one of the plurality of process activities being "participate";

instructions for repeatedly executing said entire process model including repeatedly executing said plurality of process activities;

instructions for analyzing properties of each one of said plurality of process activities each time said process model is executed;

instructions for logging information in an audit log about said properties of each one of said plurality of process activities, said audit log representing an execution history of each one of said plurality of process activities;

after repeatedly executing said entire process model, instructions for determining that the first one of the plurality of process activities repeatedly fails;

after determining that the first one of the plurality of process activities repeated fails, instructions for transforming said attribute that is assigned to the first one of the plurality of process activities to "commit after";

in response to said attribute that is assigned to said first one of the plurality of process activities being transformed to "commit after", instructions for dynamically defining a second set of transactions by dividing the plurality of process activities into the second plurality of transactions using a second set of transaction boundaries;

said second plurality of transactions determined to be an optimal number of transactions;

the process model being unchanged after the plurality of process activities are divided into the second plurality of transactions;

new process activities are not added to said process model and none of said plurality of activities is deleted from said process model after the plurality of process activities are divided into the second plurality of transactions; and the order of execution being unchanged after the plurality of process activities are divided into the second plurality of transactions.

14. The computer program product according to claim 13, wherein the properties of each process activity are indicative of costs and failure probability and reason of failure and compensation costs associated with each process activity.

15. The computer program product according to claim 13, further comprising instructions for analyzing the properties of the process activities using data mining techniques.

16. The computer program product according to claim 13, comprising instructions for modifying an impact and a relative weighting of optimization goals in response to a user input.

17. The computer program product of claim 13, further comprising:

said second plurality of transactions determined to be an optimal number of transactions to accomplish one of cost minimization, compensation minimization, minimization of execution time, throughput maximization, and minimization of failure of execution.

* * * * *